United States Patent [19]

Minette

[11] Patent Number: 5,182,955

[45] Date of Patent: Feb. 2, 1993

[54] BOREHOLE FORMATION MODEL FOR TESTING NUCLEAR LOGGING INSTRUMENTS

[75] Inventor: Daniel C. Minette, Madison, Conn.

[73] Assignee: Western Atlas International, Inc., Houston, Tex.

[21] Appl. No.: 545,305

[22] Filed: Jun. 26, 1990

[51] Int. Cl.$^5$ ............................................. G12B 13/00
[52] U.S. Cl. .................................... 73/865.6; 73/1 R; 250/252.1
[58] Field of Search ...................... 73/1 R, 152, 865.6, 73/151; 250/252.1, 256

Primary Examiner—Hezron E. Williams
Assistant Examiner—Michael J. Brook
Attorney, Agent, or Firm—Darryl M. Springs

[57] ABSTRACT

The borehole formation model is built by stacking in a spaced relationship selected glass plates to simulate the formation. Each glass plate has a circular hole in the center to simulate the oil or gas borehole. The hole can be sized in different sets to simulate various borehole diameters and for accommodating casing/cement sections for simulating cased boreholes. The glass plates are supported by plastic spacers. The spacers are sized to provide a matrix section having uniform distances between layers. The "stacked" glass/spacer matrix provides only glass for simulating the formation "pore space". The glass plates have a uniform thickness, and the porosity of the simulated formation can be changed by changing the thickness of the plastic spacers. After stacking the glass plates, a "borehole" is constructed by inserting a thin stainless steel tube through the center holes of the glass stack and sealed at the bottom. Then an outer enclosure is lowered over the glass stack and bolted and sealed into place at the base of the stack. The glass stack and isolated borehole can then each be filled with a selected liquid to simulate the liquids present in the formation and the borehole under different logging conditions, or the glass stack may be left empty to simulate gas. Other casing sections of various sizes, weights and material types may be placed in the glass stack center holes in place of the borehole liner to simulate cased-hole conditions during testing.

9 Claims, 6 Drawing Sheets

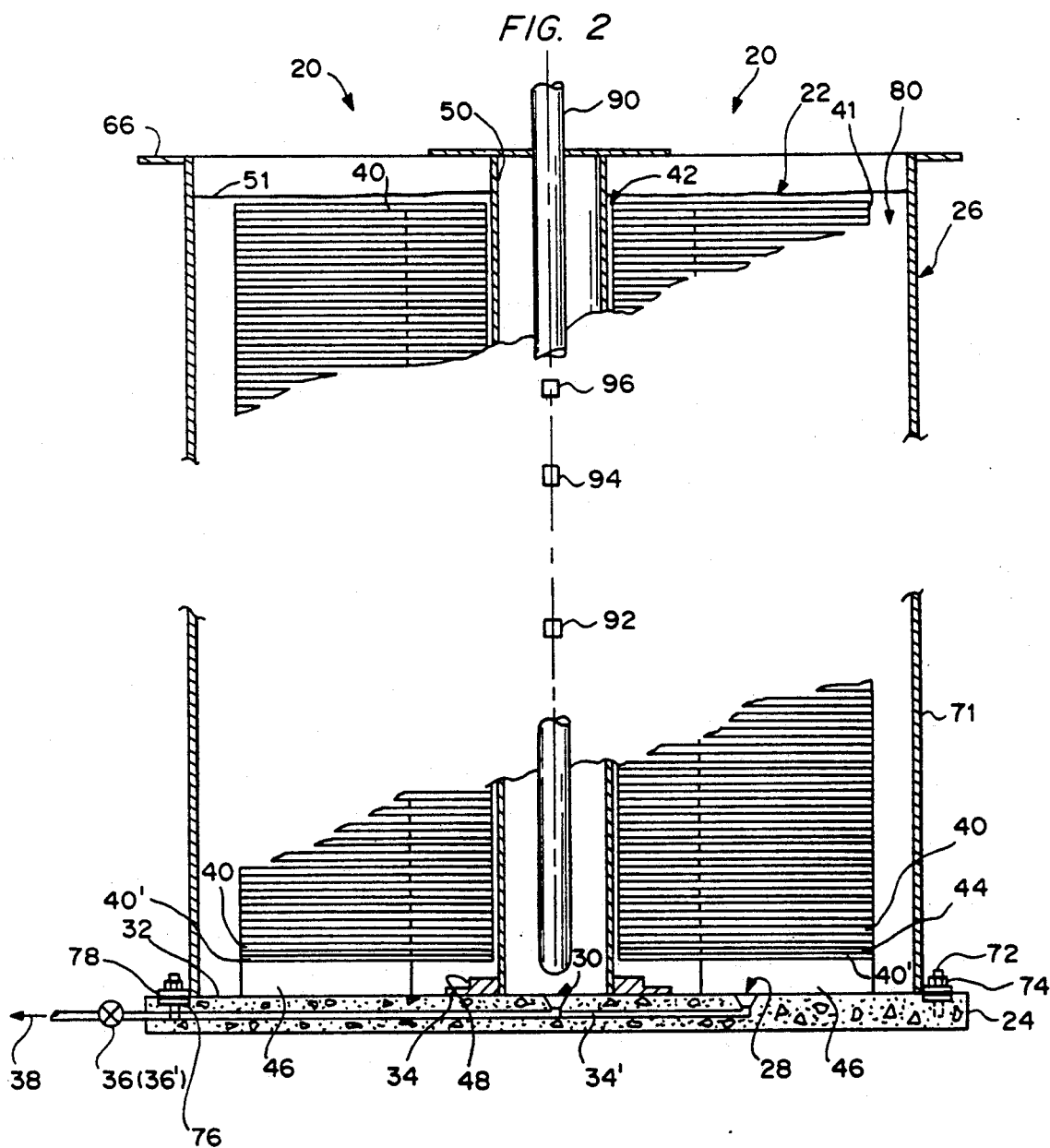

BOREHOLE FORMATION MODEL FOR TESTING NUCLEAR LOGGING INSTRUMENTS

BACKGROUND OF THE INVENTION

This invention relates generally to apparatus for simulating a laboratory rock matrix formation for testing downhole logging tools. More specifically, this invention relates to a stacked laminated glass test formation for testing nuclear well logging instrument responses in a laboratory test situation.

Laboratory test formations are essential to accurately define nuclear well logging instrument responses and environmental corrections. Laboratory measurements are used to determine tool reactions to a number of formation parameters and to a variety of environmental conditions. In recent years computer modeling has become an increasingly important addition to laboratory measurements, but laboratory formations are still needed for bench marks and in those situations where modeling does not yet provide sufficient accuracy. Laboratory formations must reliably simulate appropriate petrophysical and environmental characteristics to produce the nuclear instrument response that would be obtained in the real-world environment.

Laboratory test formations have traditionally been constructed from either large blocks of quarried rock or from specially prepared gravel or sand-sized particles in large tanks. Each of these techniques has certain disadvantages. Homogenous quarried formations in each of the desired porosity ranges are difficult, if not impossible, to find, and their pore fluids cannot easily be changed. Gravel tank formations are more readily flushable with different fluids, but very low porosities cannot be produced. Another disadvantage of both quarried rock and gravel tank formations is that a set of several formations with precisely the same porosity and matrix properties cannot be constructed. For example, a set of formations with different hole sizes will generally have slightly different porosities or slightly different thermal neutron absorption cross sections.

Another model formation that has been suggested was made in horizontal layers, consisting entirely of solid material. Once constructed, formation parameters could not be changed. Still another alternative technique is a model formation consisting of a lattice of vertical novaculite (Arkansas stone) rods of rectangular cross section glued together with spaces to simulate porosity. This fluid-filled model was readily flushable and the porosity could be adjusted over a limited range by inserting additional rods into the vertical spaces. However, the model suffered from vertical neutron streaming in the lattice of stone rods which is undesirable in a testing situation.

The present invention presents a new formation constructed from stacks of large sheets of selected glass and offers significant advantages. These advantages include straightforward porosity adjustment, ease of fluid flushing, and totally consistent matrix properties with no vertical neutron streaming in the formation. Various combinations of glass layers and spacers of differing thicknesses can be used in the stack to represent porosities from zero to well beyond the values normally encountered in reservoir formations. This is done with absolutely no change in the moderating, absorbing, or other properties of the simulated matrix. The test formation construction allows a variety of formation and borehole fluids to be used. Thus, formation and environmental parameters can be changed over a wide range to aid in characterizing the response of nuclear logging instruments.

SUMMARY OF THE INVENTION

In accordance with one principle of the invention, apparatus for simulating an earth formation for laboratory testing nuclear logging instruments is disclosed. The test formations are built by stacking large square glass plates, each with a circular hole in the center to simulate the oil or gas well borehole, and sized in different sets to simulate various borehole diameters and for accommodating casing/cement sections for further simulating cased boreholes. The plates of glass are supported by plastic spacers at each corner. The spacers are generally sized to provide an octagonal section having uniform distances between layers. The "stacked" glass/spacer matrix provides (except for the center borehole) only glass or "pore space" (i.e., the spaces between the glass sheets).

The glass plates have a uniform thickness, and therefore, the porosity of the formation can be changed by varying the thickness of the plastic spacers in order to vary the "pore space" between the adjacent "vertically stacked" sheets. The tolerance in the thicknesses of the glass sheets and spacers is held to less than 0.01 inches, resulting in very small (generally less than 0.16 p.u.) for the stacked glass formation.

Glass was chosen for the matrix material because of its similarity to sand (quartz), but most glasses also contain other minerals as well. Since the formation is constructed primarily to test neutron-producing tools, strong neutron absorbers, such as Baron (often added to glass to improve its thermal shock resistance) cannot be present other than just as trace elements. Accordingly, laboratory analysis of all glass used is essential in order to insure accurate and consistent results.

After stacking of the glass plates, a cylindrical "borehole" constructed of a thin stainless steel tube is threaded through the center holes of the glass stack and sealed to a flange at the bottom. Then an outer square tank is lowered over the glass stack and bolted into place and sealed around the base of the stack. The glass stack and isolated borehole can then be filled with a liquid, for example, diesel oil, fresh or salt water, or left empty to simulate gas. Cement-coated casing sections of various sizes, weights and cement types may be placed in the glass stack center holes in place of the borehole liner to simulate cased-hole conditions during testing.

The laminated glass stack invention as hereindisclosed provides the nuclear well logging tool a totally consistent matrix property, since the same glass sheets can be used indefinitely, and also provides an almost unlimited selectable "formation" porosity adjustment by varying the space between the glass sheets. In addition, since the glass will not absorb the fluids introduced into the test formation, and the sheets have smooth polished surfaces, the "formation" may readily be flushed and cleaned for introducing a different liquid without having to disassemble the stacked glass plate assembly.

Accordingly, one principal feature of the present invention is to provide a test formation for nuclear logging instruments that presents totally consistent simulated formation matrix properties from test to test.

Another principal feature of the present invention is to provide a test formation for nuclear logging instruments that is capable of presenting unlimited preselected porosity values for a simulated formation from test to test.

Yet another principal feature of the present invention is to provide a test formation for nuclear logging instruments that is capable of presenting preselected formation fluids that are variable from test to test without having to disassemble the test formation.

Still another principal feature of the present invention is to provide a test formation for testing logging instruments in which the "formation" fluid introduced into the formation may readily be drained, flushed and changed without having to disassemble the test formation.

BRIEF DESCRIPTION OF THE DRAWINGS

In order that the manner in which the above-recited advantages and features of the invention are attained can be understood in detail, a more particular description of the invention may be had by reference to specific embodiments thereof which are illustrated in the accompanying drawings, which drawings form a part of this specification.

In the drawings:

FIG. 2 is a vertical cross-section of the test formation apparatus as taken along lines 2—2 of FIG. 1.

FIG. 3 is a fragmentary vertical cross-sectional view of the central base portion of the test formation apparatus showing the sealing arrangement for the borehole liner.

DETAILED DESCRIPTION OF THE PREFERRED EMBODIMENTS

Figure 1:
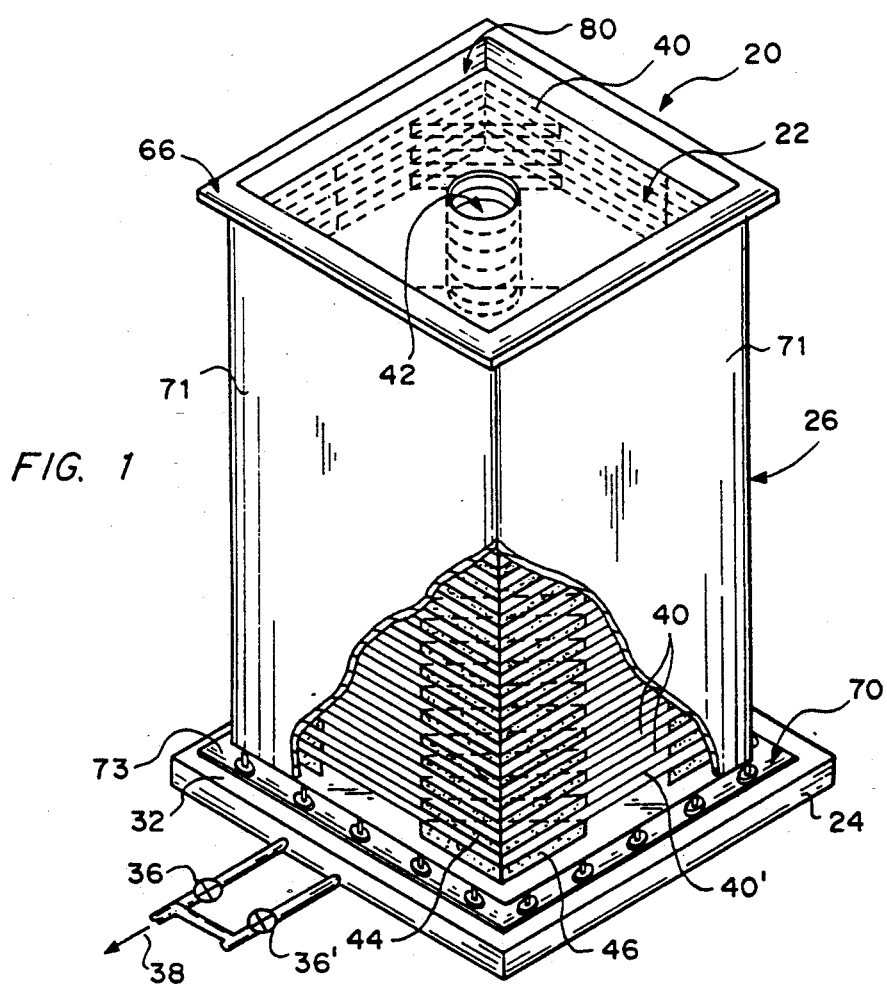
FIG. 1 is a perspective view, shown partially cutaway, of the test formation apparatus according to this invention.

Referring now to FIGS. 1–4, the glass-stack test formation 20 according to this invention is shown. The test formation 20 includes a stacked-glass formation assembly 22, a rigid base 24 constructed such that it can support the weight of the stacked-glass formation 22 including the fluids introduced therein and an outer steel tank 26 for surrounding the stacked-glass formation and holding fluids therein. Base 24 may be constructed of concrete or reinforced steel plates, or the like. Drains 28 and 30 may conveniently be disposed in the base 24 for communicating with top surface 32 of the base and into piping 34 and 34' through valves 36 and 36' for discharge at 38 to a drainage system or pumping system as appropriate. Alternatively, the fluids may be removed from the test formation structure by insertion of suitable hoses (not shown) and the fluids pumped out for discharge and disposal.

The stacked glass formation 22 further comprises a plurality of identical square glass sheets having a central circular hole 42 disposed therein, and a plurality of right-triangle shaped spacers 44 disposed at each corner of the square glass sheets 40. The first or lower glass sheet 40' of the formation 22 is supported on four right-triangle shaped spacers 46 having a predetermined thickness for accommodating a circular sealing flange 48 mounted on base 24 for purposes to be hereinafter further described.

The stacked-glass formation 22 is constructed by vertically stacking the square glass plates 40 on the spacers 44 set in each corner. The glass sheets are of uniform thickness, and the spacers are of a uniform preselected thickness for providing a uniform "space" between the glass sheets 40. Any desirable glass thickness may be utilized, however, it was found advantageous to use glass sheets of a uniform 0.50 inches in thickness, held to a tolerance of 0.01 inches. The spacers 44 may be constructed of any suitable material, but it was found advantageous to use spacers constructed of a polypropylene material which does not have a tendency to "run" or flatten under the weight experienced in the stacked-glass formation. The spacers 44 may be of any preselected uniform thickness to simulate preselected formation porosites of the test formation. With glass plates 40 having a thickness of 0.50 inches, spacer thickness of 0.5, 0.25, 0.125 and 0.0625 inches will produce, respectively, "porosites" of 50%, 33.3%, 20% and 11.1% for the stacked-glass formation 22. Obviously, other porosites could readily be simulated by choosing spacers of different thicknesses. If the tolerance in the thickness of the plastic spacers 46 is also held to 0.01 inches, the combination with the tolerances of the glass plates (also 0.01 inches) will result in an uncertainty in porosity of less than 0.16 porosity units (p.u.) for the 11.1 p.u. configuration and smaller errors at other, larger porosities.

The square glass plates 40 may be constructed of any suitable size and have a preselected center hole 42. For purposes of simulating "standard" size boreholes normally drilled in earth formations, center hole sizes of 6.125, 8.0 and 12.25 inches were selected, and nominally referred to as the "6", "8" and "12"-inch sets, respectively. For the 6 and 8-inch sets, it was found advantageous for the glass sheets 40 to have side dimensions of 42 inches, and for the 12-inch set, side dimensions of 48 inches. Of course, the glass sheets 40 may have other selected dimensions that will provide the desired continuity and uniformity of formation matrix and porosity characteristics. Similarly, the right-triangle spacers 44 may have side dimensions of any predetermined size that does not affect the characteristics of the stacked-glass formation 22. For 6, 8 and 12-inch glass sets having the dimensions above described, it was found advantageous to use spacers 44 having 12-inch sides, thus forming an octagonal glass section that measures 42 inches across the faces (for the 6 and 8-inch sets) and 48 inches across the faces (for the 12-inch set).

The glass-stack formation 22 may be constructed to any preselected height utilizing a preselected number of glass plates that will provide sufficient depth to accommodate testing of the selected nuclear logging tool. In the instant case, it was found advantageous to use a stack of glass plates approximately 6 feet in height, including 72 glass plates 40. Of course, the exact height will vary depending on the desired "porosity" of the test formation and the "pore" spacing that is utilized between plates.

Glass was chosen as the simulated formation material because of its similarity to sand (quartz) of an oil/gas formation. Samples of each glass set were carefully analyzed to be careful that the glass did not contain more than a trace element of neutron absorbing materials, such as Boron. The analysis of a typical glass set is shown below in Table 1.

TABLE 1

| Oxide or Element | Weight Concentration |
|---|---|
| $SiO_2$ | 72.8% |
| $Na_2O$ | 14.8% |
| CaO | 9.0% |
| MgO | 3.9% |
| B | 2.7 ppm |
| Cd | <1 ppm |
| Sm | <0.5 ppm |
| Eu | <0.1 ppm |
| Gd | <0.5 ppm |

After the glass stack is built, a cylindrical "borehole" 50 made of a suitable material is inserted through the axially aligned holes 42 in each of the glass plates and inserted into a circular flange 48 centrally disposed on the base 24. The "borehole" cylinder 50 ma be constructed of any suitable material for simulating the "borehole", isolating desired borehole fluids from formation fluids, and not interfering with the logging tool measurements. It was found advantageous to construct the "borehole" sleeve or cylinder 50 of stainless steel having a normal 0.1 inch wall thickness, the OD of the cylinder being slightly smaller than the nominal 6, 8 or 12-inch size of the glass plate holes 42. The lower end 52 of the sleeve 50 may be sealed from the volume in the surrounding stacked glass plates/spacers 40/44 by means of the flange 48 which is suitably attached to the base 24 by any convenient securing means, such as by a plurality of bolt nut 54/56 combinations shown. The inner circular surface of the flange 48 carries a sealing O-ring 58 carried by a suitable circular groove 60 disposed therein. The ID of the flange 48 is sized to accommodate the OD of the sleeve 50 for a snug sealing fit at O-ring 58 to isolate the interior of the sleeve 50 from the surrounding volume.

An outer steel enclosure 26, having an open upper flanged end 66, an open lower flanged end 70 and four sides 71, is lowered over the stacked-glass formation 22 and attached to the base 24 by any convenient attaching means, such as the bolt/nut 72/74 combination shown. The base 24 may have disposed on the upper surface 32 thereof a mounting surface 76 such as flat steel plates for receiving the flat flanged portions 73 of the tank lower end 70. A ribbon seal 78, constructed of an appropriate sealing material, is disposed between the mating mounting plate 76 and the flange 73 in order to insure that the tank 26 will not leak when filled with the selected formation fluid. The drain 28 is disposed in the base to permit drainage of the tank 26 volume outside of the borehole volume within sleeve 50. The enclosure is sized to provide a uniform space 80 around the edges of the glass stack 22 in all glass set sizes, and the enclosure is high enough to accommodate the highest expected glass stack arrangement and to permit fluid disposed in the enclosure 26 to cover the uppermost glass plate 40 to a specified level. In practice, the fluid space surrounding the glass stack 22 has been found to conveniently be about 3 inches.

Figure 4:
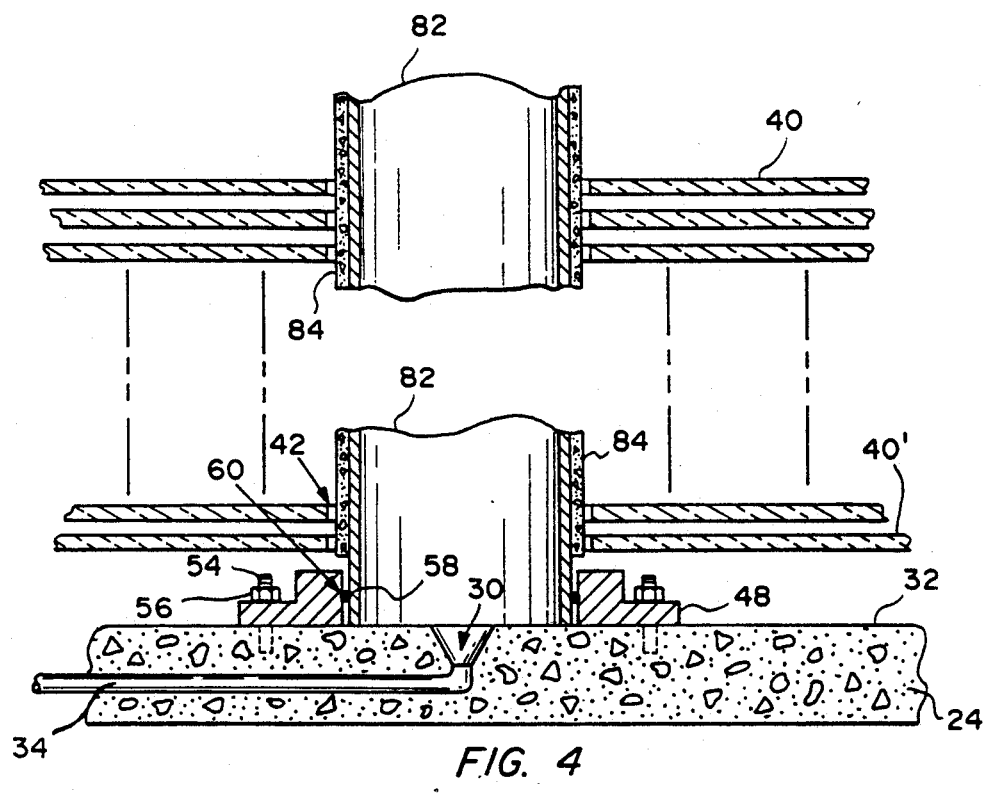
FIG. 4 is a fragmentary vertical cross-sectional view of the top and base portions of the test formation apparatus showing a portion of a cement-coated casing section disposed in the aligned center hole of the stacked glass sheets and showing the sealing arrangement for the casing section.

A casing section 82 having a cement coating 84 may be disposed through the central circular holes 42 in the glass-stack arrangement to simulate a cased borehole (see FIG. 4). The casing may be of various sizes and weights of steel and the cement coatings may have various thicknesses and be of differing cement types for simulating various types of casings and cement coatings used commercially. The cement-coated casing section 82 may be axially inserted into the sleeve 50 or the sleeve 50 may be removed, as is shown in FIG. 4, and the lower end 86 of the casing section 82 may be received into the circular sealing flange 48 of the type hereinabove earlier described for sealing the cased borehole from the glass stack formation. The flange 48 is provided with an O-ring seal 58 set in a circular groove 60 disposed in the ID of the flange ring for sealingly engaging the OD surface of the casing section for isolating the interior of the casing section from the surrounding glass stack 22.

A representative neutron logging tool 90 is shown schematically in FIG. 2 disposed within the glass-stack formation 22 for making appropriate logging measurements therein. The tool 90 will be disposed within the circular borehole defined by the axially aligned circular holes 42 in the vertically stacked glass plates 40, and may be used either with thin sleeve 50 or with the cement-coated casing section 82 as hereinabove described. The tool 90 will include a neutron source 92 and a detector 94. In pulsed neutron tools, an additional "long" spaced detector 96 will also be included.

In operation, the "borehole" volume defined by the sleeve 50 or the casing section 82 and the volume within the tank 26 minus the "borehole" volume (the "formation" volume) are then filled with a selected fluid to simulate the borehole and formation fluids. The selected fluid may be diesel oil, fresh or salt water, etc. as desired. To simulate gas, the borehole and formation volumes may be left empty. In introducing the fluids into the glass-stack formation 22, the fluid may have to be introduced under pressure or circulated between the glass plates 40 by conventional means in order to "wet" the glass-stack plates and displace air that may be trapped between the glass plates 40, particularly in the "thinner" spacings.

After measurements have been made with a selected logging tool, such as tool 90, the borehole fluid may be changed by draining from the sleeve 50 or casing section 82 the fluid contained therein through drain 30, piping 34 and valve 36. The sleeve or casing section can then be flushed by suitable flushing means (not shown) and a new liquid substituted for additional measurements without having to disassemble the formation 22.

In addition, if it is desired to change the formation fluid, the formation volume may be drained through drain 28, piping 34' and valve 36'. The glass plates 40 and the inside of the tank 26 may then be flushed by any suitable pressurized flushing means (not shown) in order to remove the original formation fluid. Then a new fluid may be introduced into the enclosure 26 and the glass stack formation 22 and new logging measurements taken without disassembling the formation 20 and not changing the matrix and porosity characteristics of the glass-stack formation 22.

Several questions had to be answered before the glass-stack test formation 22 could be used in place of actual-rock laboratory formations. First, does neutron logging instrument response change because the formation is a laminated stack instead of a homogenous mixture of matrix and porosity? Second, is the proposed formation large enough to avoid detectable edge effects? Third, are the nuclear properties of the selected glass such that the glass formations represent typical reservoir rocks?

The most critical issue is whether the neutron logging instrument responds to a laminated formation just as it does to a homogeneous mixture with the same matrix, porosity and pore fluid. For example, consider a neutron porosity tool. If the lamination thicknesses are larger than the source-to-detector spacing, the tool response fluctuates from zero to 100% as it is moved up and down the borehole. If the laminations are made thinner but the average porosity remains the same, these fluctuations will diminish and, at some thickness, will be smaller than the tool can measure. Clearly, the test formation must have laminations thin enough so that instrument response does not vary with position.

There is an additional consideration. The mean free path of thermal neutrons in glass is an order of magnitude greater than it is in water. Thus, the glass layers provide a path for neutron flow away from the source that does not exist in a homogeneous formation. This "streaming" effect may destroy the shape of the neutron distribution enough to affect the instrument response. The use of thinner laminations reduces the significance of this effect.

Two Monte Carlo codes were used to simulate the neutron porosity and the pulsed neutron decay tool responses in glass stacks. The models were geometrically simple. Each consisted of a finite-sized tank containing numerous glass sheets (but no borehole), with a source at the center and two detectors at different distances from the source along the axis of the tank. An Am-Be source energy spectrum was used for the neutron porosity calculation, and a 14-MeV monoenergetic source was used for the pulsed neutron case. In the neutron porosity simulation, both the thermal neutron collision density distribution and detector counting rates were estimated. For the pulsed neutron model, the detector counting rates were estimated in several time channels and the formation capture cross section was then determined from a single exponential fit.

Figure 5:
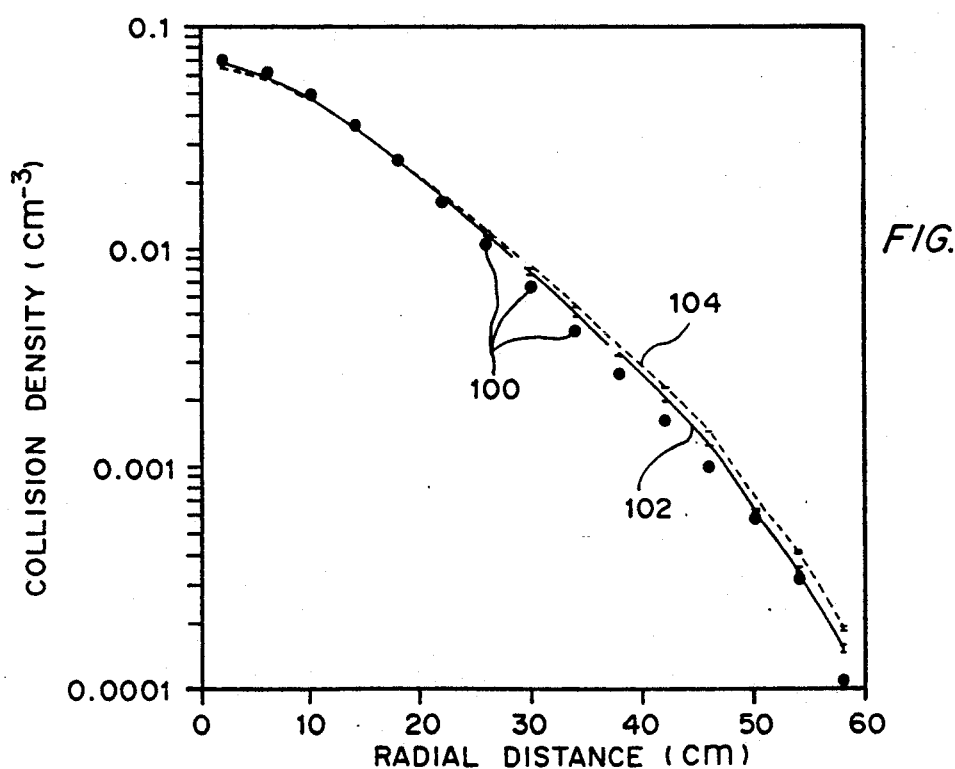
FIG. 5 is a graphical representation of the Monte Carlo calculations of neutron radial collision density for selected glass matrix models.

The simple Monte Carlo code discussed above is ideally suited for estimating the net influence of lamination thickness on the neutron distribution, since instrument design can be ignored. and because it is a convenient way to "make" a homogeneous glass and water formation. The spatial distribution of the thermal neutron collision density was calculated for three different lamination conditions. The difference between them was expected to peak at 50% porosity, but since that was outside the normal logging range, each computation was made for a 33-p.u. freshwater-filled glass formation. FIG. 5 shows the plots of three thermal neutron collision densities calculated for a homogeneous mixture of glass and water at the points 100, an assumed "single stack" laminated formation with an 0.5-inch glass and 0.25-inch water-filled pore space as shown by the solid line trace at 102, and an assumed "double stack" laminated formation with 1.0-inch glass layers and an 0.5-inch water-filled pore space as shown by the dotted line trace at 104. FIG. 5 shows the three radial (parallel to the layers) collision density distributions for the worst case, at the axial coordinate of the source. The statistical errors in the data points range from 0.5% to 5%. Within 20 cm of the vertical axis, all three distributions are virtually the same, but outside that radius the thicker laminations show higher collision density. Clearly, some neutron streaming does occur, but it has little effect on the distribution of neutrons near the axis.

Figure 6:
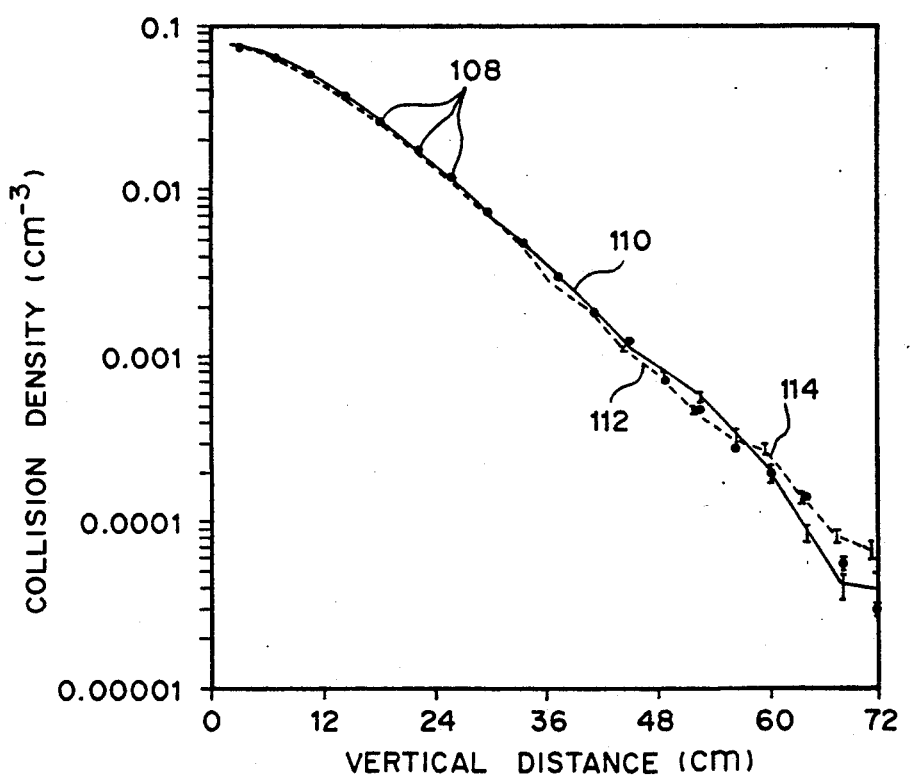
FIG. 6 is a graphical representation of the Monte Carlo calculations of neutron axial collision density for selected glass matrix models.

FIG. 6 shows the plots of the collision density distributions along the axis (perpendicular to the layers) for the same three model assumptions shown in FIG. 5 above. The plot of the thermal neutron collision densities calculated for the homogeneous mixture of glass and water is shown by the points 108. The plot for the assumed "single stack" laminated formation is shown at 110. The plot for the "double stack" laminated formation is shown by the dotted lines 112. The distribution plots along the vertical axis show similar statistical errors to the plots shown in FIG. 5. Within this statistical uncertainty, the laminated formations are indistinguishable from the homogeneous one. The calculation for the thicker laminations appears to predict significantly higher collision density beyond 50 cm from the source (see point 114) but the statistical errors of those points are quite large. It is not clear that the difference is real. It is safe to conclude that the nuclear properties of a 33-p.u. homogeneous mixture are very similar, if not identical, to those of the equivalent single-thickness glass configuration.

Figure 7:
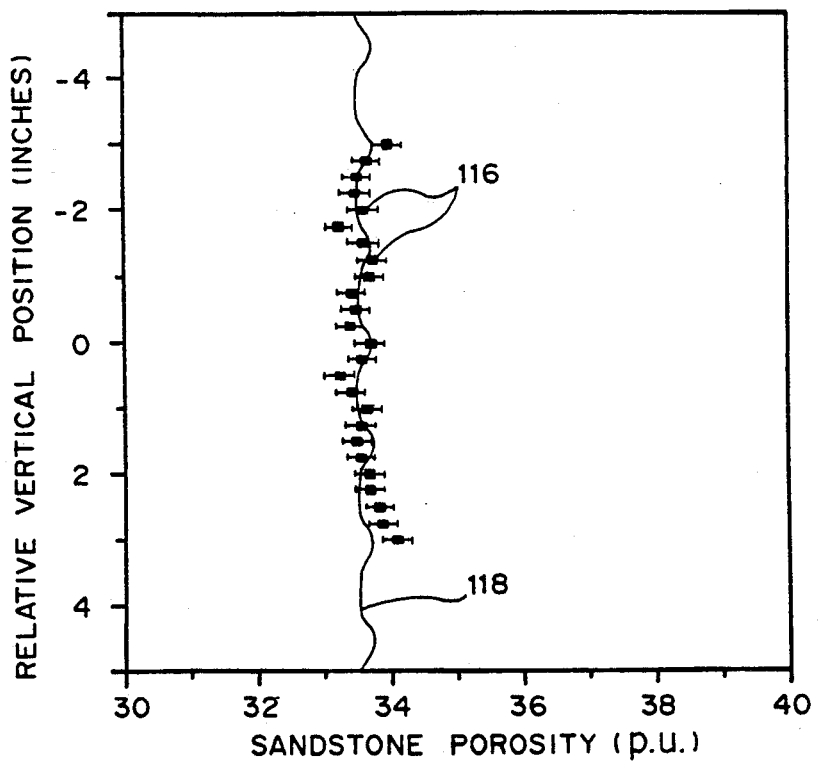
FIG. 7 is a graphical representation of compensated neutron log measurements made in a double-layer 33.0% porosity glass stack expressed in sandstone porosity units (p.u.).

To check this result under realistic conditions, compensated neutron log measurements were made in a double-layer 33% porosity stack made of alternate double sheets of glass (1-in. total thickness) with 0.5-in. water-filled pore spaces. A series of measurements was taken at 0.25-in. intervals through the central portion of this formation. FIG. 7 is a plot of these values expressed in sandstone porosity units and shown as points 116, with uncertainties derived from counting statistics. The average value is 33.6 p.u., slightly higher than the 32.9 p.u. obtained when the same porosity is made with single sheets of glass. This deviation is opposite to that predicted by the Monte Carlo calculation, and it probably results from the small standoff between the tool and glass. This data can also be used to check for periodic variation that would indicate the laminations themselves are detectable by the tool. The solid line 118 in FIG. 7 shows the best fit of a periodic waveform to these points. The amplitude of this waveform is not statistically different from zero, demonstrating that even these thicker laminations are too thin to be detected by the tool.

Figure 8:
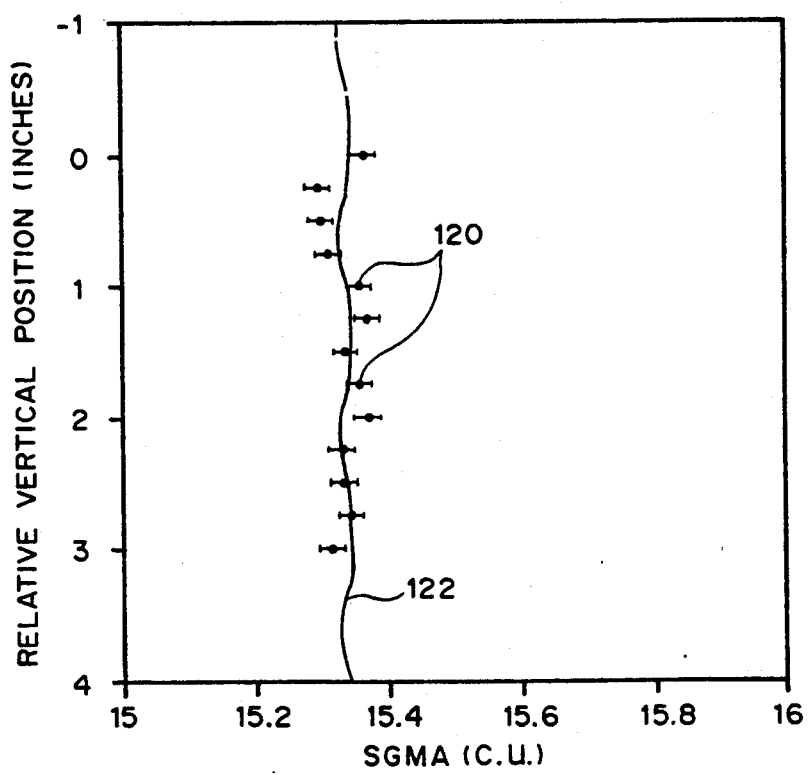
FIG. 8 is a graphical representation of pulsed neutron delay log measurements made in a double-layer 33.0% porosity glass stack expressed in macroscopic thermal neutron capture cross-section capture units (c.u.).

A similar series of measurements were taken with a pulsed neutron logging tool in the 33% double-stack formation, with the same spacing between measurements. Because 14-MeV neutrons generated by the pulsed neutron source penetrate further into the formation and because gamma rays are detected instead of neutrons, any change in neutron streaming due to layer thickness should be more apparent on a pulsed neutron log than on a thermal neutron porosity log. FIG. 8 is a plot of the data points at 120 and the fitted wave form at 122. The average pulsed neutron tool sigma value of 15.3 c.u. agrees with the 15.5 c.u. obtained from the equivalent stack made with single layers of glass. The amplitude of the fluctuations is, again, statistically insignificant.

The second issue is one that must be considered for any laboratory formation, regardless of its construction: Is it large enough to avoid edge effects? The answer to this question depends on the design of the specific logging device to be used and on the formation parameters. The detector spacings and depth of investigation must be considered, and the depth of investigation usually depends on formation properties. For each sequence of measurements, the test formation 22 must be large enough for the "worst case" expected during that series. The adequacy of the vertical dimension for the glass stack formation 22 can be easily tested by making a progression of measurements up and down the borehole. If a plateau of constant readings is found with the tool measure point near the vertical center of the stack 22, the formation is large enough. if no plateau is found, more glass layers 40 can be added to increase the overall height. The sufficiency of the horizontal extent of the glass stack 22 is more difficult to determine experimentally. Once again, a simple Monte Carlo model provides the best solution to the problem. Edge effects for both neutron porosity and pulsed neutron decay measurements were estimated in this way.

The effect of the radial formation size on the neutron porosity tool response was studied by comparing the tool counting rate ratios for 4-ft- and 8-ft-diameter laminated formations. Since the effect increases as porosity decreases, calculations were made at 0, 5 and 11 p.u. The Monte Carlo model does not have a borehole and assumes neutrons that reach the edge of the formation disappear. The presence of a water-filled borehole and water at the edge of the glass at space 80 should reduce the size effects. These two assumptions represent an extreme case that provides an estimate of the maximum error from edge effects in the 4-ft formation response.

Figure 9:
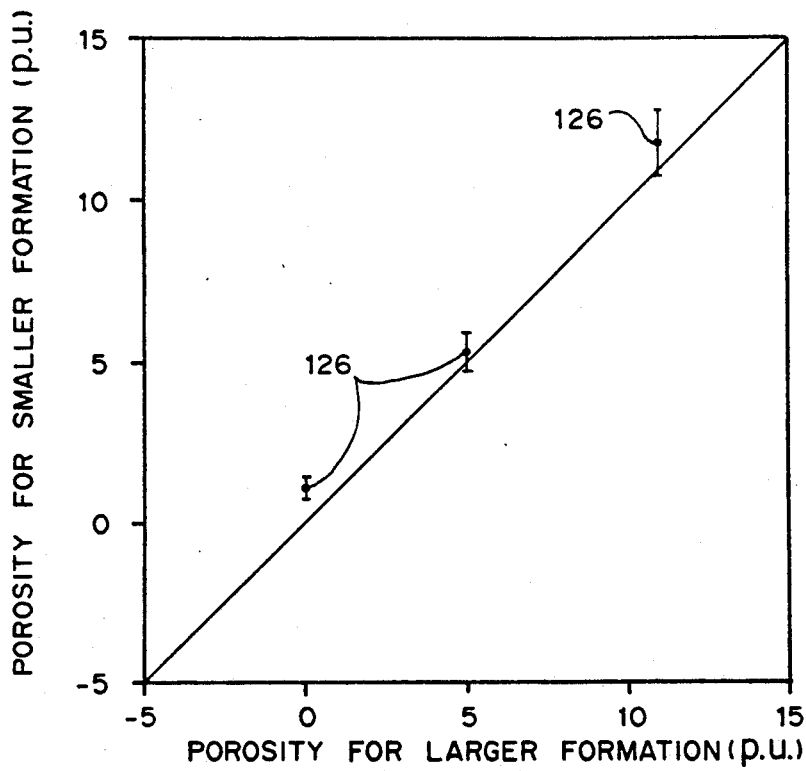
FIG. 9 is a graphical representation of the crossplot of the Monte Carlo calculations of predicted porosity of two sizes of glass stack formations.

FIG. 9 shows a crossplot of the predicted porosity values for the 4-ft diameter formation versus the 8-ft formation at points 126. Porosity values were determined by fitting a polynomial to the counting rate ratios for the 8-ft data. Despite the extreme assumptions of the model, the difference between the two sizes (except at 0 p.u.) is less than the statistical errors ($1\sigma = 5\%$) of the calculations. As expected, the maximum difference is 0% porosity and is about 1 p.u. A formation with a borehole will have a smaller edge effect than is seen in the model. To verify this, another Monte Carlo model, incorporating an 8-in. borehole, was used to compare a 0-p.u. 42-in. glass-stack 22 with a similar formation of infinite dimension. The porosity difference was 0.76 p.u., with a statistical uncertainty of 0.78 p.u. The actual laboratory formation has a wall of water outside the glass in the space 80 between the glass edge 41 and the tank wall 26 that should further reduce edge effects. Even at 0 p.u., the error in porosity caused by edge effects is comparable to the uncertainty in porosity of quarried rocks. Thus, the test formation 22 is large enough as hereinabove described to avoid edge effects with typical thermal neutron porosity tools.

The effect of the radial formation size on the pulsed neutron decay tool response was studied by a Monte Carlo method different from that presented for the neutron porosity tool. Modeling of the pulsed neutron tool requires that the detector response be estimated in several time channels to form a decay curve. The statistical errors of the decay response are large enough to mask any difference resulting from changes in the formation size. Therefore, a Monte Carlo perturbation technique was used to provide a better means of calculating the difference in the formation capture cross section between 4- and 8-ft-diameter laminated formations. The formation diameter in the model was set to 8 ft with an imaginary boundary at 4 ft. Capture gamma rays were collected in two different tallies: one for the total response from the 8-ft formation and the other for the response from the inner 4-ft zone. Since the total response was expected to have an exponential decay in time, the ratio of the 4-ft to the 8-ft response was expected to follow the same relationship. The difference in the capture cross section between the two formations was determined from getting the ratio of detector response in the two formations to a single exponential function.

Table 2 shows the difference in the capture cross section between the two formation sizes at 0, 11, and 20 p.u.

TABLE 2

| Porosity (p.u.) | $\Sigma$(8 ft) (c.u.) | $\Sigma$(4 ft)-$\Sigma$(8 ft) (c.u.) | Relative Error (%) |
|---|---|---|---|
| 0 | 8.4 | 3.2 | 38.1 |
| 11 | 9.9 | 0.11 | 1.1 |
| 20 | 11.1 | 0.072 | 0.6 |

The difference at 0 p.u. is about 3 c.u., which suggest the 4-ft diameter formation is too small at that porosity. However, because the model predicts an upper limit of the difference in the capture cross section and is suited to predict only small changes, the actual difference at 0 p.u. should be much less than 3 c.u. the difference at 11 and 20 p.u. is about 0.1 c.u., the same order of magnitude as the statistical errors of the calculations. However, it can be concluded from the data of Table 2 that at or above 11 p.u., there is no significant error from edge effects in the tool response in a 4-ft glass stack formation 22. Overall, the horizontal dimensions of the glass plates 40 should be sufficient for most applications involving neutron or pulsed neutron measurements.

The third question that was addressed is: Do the nuclear properties of the glass correspond to those of typical reservoir rocks? The answer to this question was considered in three different ways. Glass formations were compared to rock formations by Monte Carlo simulation. Another approach considered the neutron moderating and diffusing properties of each formation. A final method compared laboratory measurements in several glass formations to similar measurements in the API and commercial test pits.

Counting rate ratios were calculated by Monte Carlo for a 0-p.u. sandstone formation (2.65 g/cm³, $\Sigma_{ma}=4.5$ c.u.) and for a 0-p.u. glass formation (2.49 g/cm³, $\Sigma_{4a}=8.45$ c.u.). The values were 0.92±0.07 for the sandstone and 0.98±0.08 for the glass. The difference between these two ratios is about 0.063±0.103. The same transform used to produce the plot of FIG. 9 translates this difference into 0.28±0.46 p.u. Thus, calculations to this level of precision do not show a significant difference between the glass and sandstone. In an actual logging environment with a borehole present, any difference would be smaller than for this model.

A second way of comparing laminated glass formation properties to those of natural rocks is through the consideration of their macroscopic nuclear parameters. Specifically, values such as slowing-down length, $L_s$; diffusion length, $L_d$; and thermal neutron capture cross section, $\Sigma$, can be used to compare various formations. One way of looking at the response of a typical thermal neutron porosity device is to consider the neutron migration length, $L_m$, of the formation. Neutrons of approximately 4 MeV energy leave the source and are slowed in the borehole and formation to thermal energy. This process is characterized by the slowing-down length. After slowing, the neutrons diffuse at thermal energy until they are absorbed. This process is characterized by the thermal diffusion length. The migration length is defined as:

$$L_m = \sqrt{(L_s^2 + L_d^2)}$$

Figure 10:
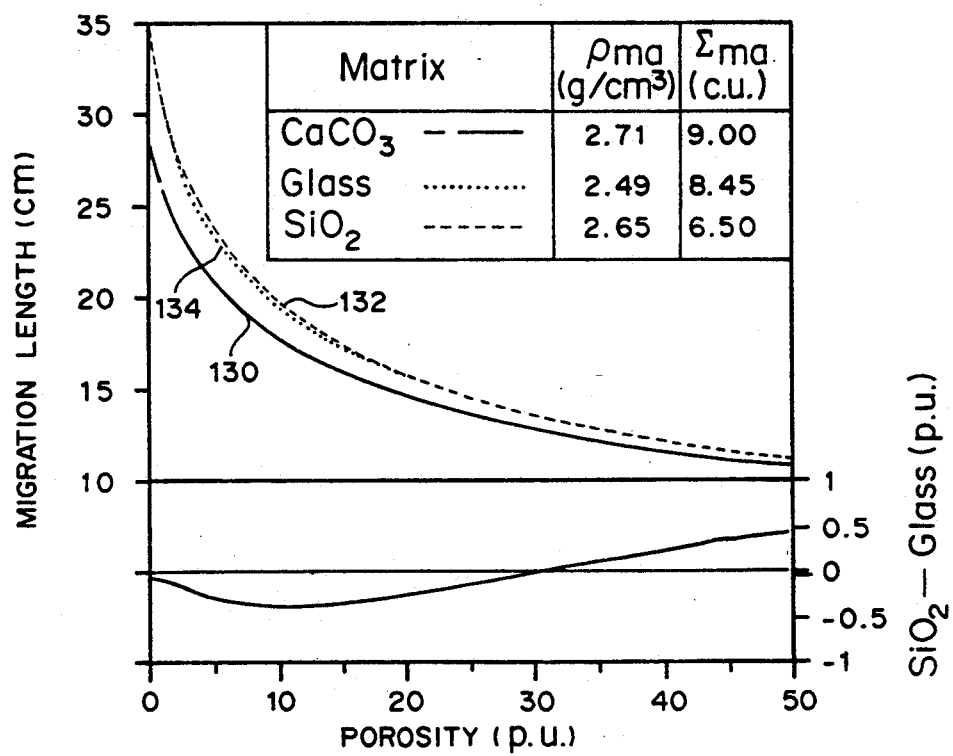
FIG. 10 is a graphical representation of the neutron migration properties of limestone, sandstone and glass.

FIG. 10 is a plot of migration length versus porosity for a glass formation and two typical reservoir stacks: a $CaCO_3$ limestone with a $\Sigma_{ma}$ of 9 c.u. is shown as the solid line curve 130 and an $SiO_2$ sandstone with $\Sigma_{ma}$ of 6.5 c.u. is shown as a dashed line curve 132. The plot for a glass formation is shown as the dotted line curve 134. The differences in porosity units between the sand and the glass are plotted on an enlarged scale across the bottom of the plot of FIG. 10. The agreement here is excellent with a maximum deviation of just over 0.4 p.u. from 0 through 50 p.u. Overall, neutron migration length computations indicate the glass formations are a good representation of a typical quartz sandstone with a thermal neutron capture cross section of 6.5 c.u. over the range of porosities normally encountered in well logging. In addition, the relationship of $L_m$ to porosity can help determine how the glass formation relates to sandstones of different $\Sigma_{ma}$ values.

Figure 11:
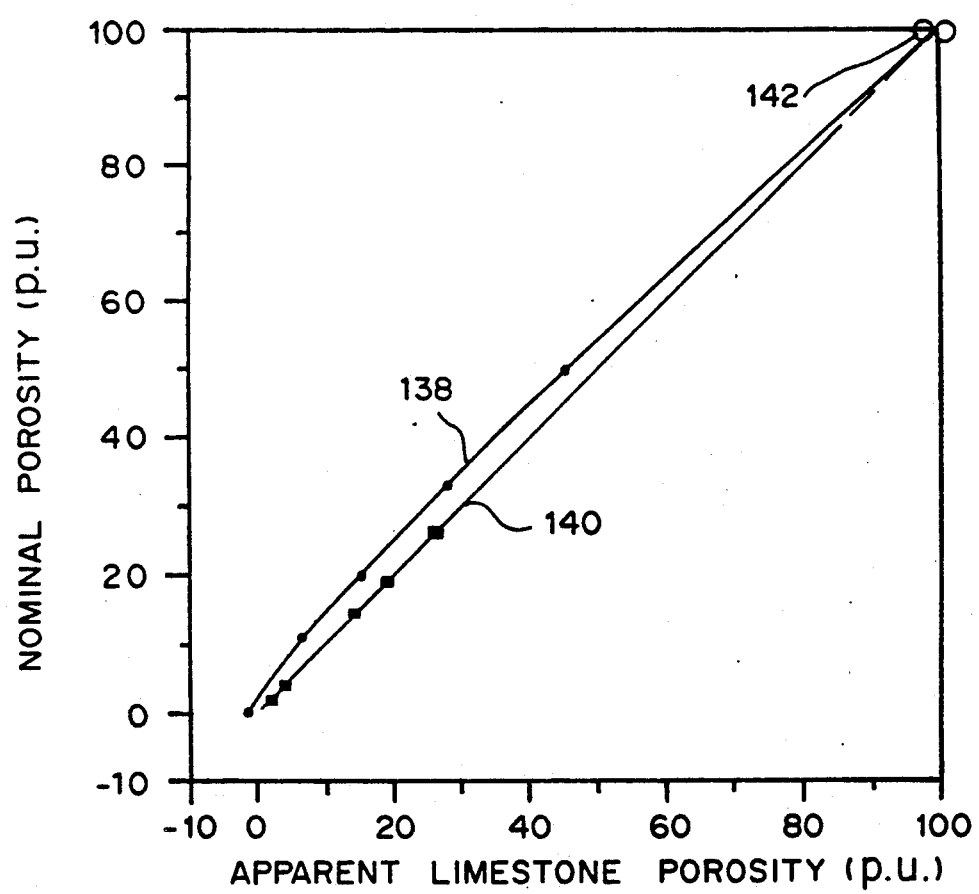
FIG. 11 is a graphical representation of compensated neutron log system measurements for glass, limestone and water as expressed in limestone porosity units (p.u.).

One final demonstration of the ability of the laminated glass formation 22 to represent a commercial rock is a comparison of measurements made at several porosities with measurements made in commercial limestone and API limestone test pits. An eight-in. borehole glass formation was configured for 0, 11, 20, 33.3 and 50 p.u., and measurements were made with a compensated neutron logging instrument at each porosity. The values, expressed in limestone porosity units, for the glass stack formation 22 are plotted and represented by curve 138 in FIG. 11, with points from the limestone test pits shown plotted along curve 140. Water tank measurements are included for completeness at 142. The consistency of these data demonstrate that the glass stack formation 22 can be used as a representative of rock formations.

From the above, it can be seen that a horizontally stacked laminated laboratory formation 22 made of selected sheets of glass 40 can be constructed to closely simulate actual rock formations. There are certain specific advantages of such formations over the traditional laboratory fixtures made of quarried rocks or tanks of gravel. These include straight-forward porosity adjustment, flushability, and completely consistent matrix properties throughout a series of measurements. A group of formations with different borehole sizes can be made with exactly the same porosity values and matrix properties. These can then be completely flushed with a variety of fluids to study hydrocarbon, salinity and absorber effects.

A specific application of the glass formation 22 is the series of measurements used to define diffusion corrections for pulsed neutron decay instruments. Other applications could include more detailed studies of absorber effects on compensated neutron logs, hole size effects on carbon/oxygen measurements, porosity response of pulsed neutron devices, etc.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

I claim:

1. A flushable simulated laboratory formation having constant known matrix properties and a preselected porosity for testing nuclear well logging instruments, comprising:

a base, a plurality of spacer members each having a preselected thickness directly related to a preselected porosity value, a plurality of glass sheets each having a preselected thickness and known matrix properties and having a central circular hole disposed therein for cooperating with said plurality of spacer members to form a vertical laminated stacked glass assembly comprising alternate glass sheets and uniform alternate spaces therebetween with the central circular holes of said glass sheets vertically aligned, wherein said preselected width of said spaces between said glass sheets when compared to the thickness of said glass sheets yields a simulated rock formation having known matrix properties and a known selected porosity value, a container member open at both ends and adapted for vertical placement over said stacked glass assembly and mounting one open end to said base, the other open end of said container member extending vertically above the top of said stacked glass assembly, means for mounting said one open end of said container member in a fluid-tight seal with said base, a cylindrical sleeve section radially sized for vertical insertion into the openings of said vertically aligned circular holes in said plurality of glass sheets for simulating the borehole in an earth formation and sized to accept a nuclear logging instrument axially therein, sealing means mounted on said base and cooperating with the lower end of said cylindrical sleeve for effecting a seal between said sleeve and said base for isolating the volume of said sleeve interior from the volume of the interior of said container member including said stacked glass assembly, a first selected fluid for introduction into said sleeve cylinder for simulating the fluid present in a borehole, and a second selected fluid for introduction into said container member exterior of said cylindrical sleeve for filling the container member and the spaces between each of said glass sheets in said stacked glass assembly for simulating the fluid present in a simulated rock matrix formation surrounding a borehole.

2. The laboratory formation as described in claim 1, wherein said plurality of glass sheets are constructed of a glass that does not contain more than a trace of a neutron absorbing element.

3. The laboratory formation as described in claim 2, wherein said neutron absorbing element is Boron.

4. The laboratory formation as described in claim 1, wherein said spacer members are constructed of a plastic material.

5. The laboratory formation as described in claim 1, wherein said means for mounting said one open end of said container with said base includes
   a laterally projecting flanged edge extending around the entire periphery of said one open end of said container,
   a seal member disposable between the base and the lower surface of said flanged edge of said one end of said container, and
   fastening means cooperating with said base and said flanged edge for sealingly fastening said flanged edge of said one open end of said container to said base.

6. The laboratory formation as described in claim 1, wherein said cylindrical sleeve section is constructed of a material that will not interfere with nuclear logging measurements performed therein.

7. The laboratory formation as described in claim 6, wherein said cylindrical sleeve section is constructed of stainless steel.

8. The laboratory formation as described in claim 1, wherein said sealing means for effecting a seal between said base and the lower end of said cylindrical sleeve includes
   a circular flange mounted on said base in axial alignment with the center holes disposed in said glass sheets, and
   seal means cooperating with said flange and the lower end of said cylindrical sleeve for sealing said sleeve to said flange.

9. The laboratory formation as described in claim 8, wherein the inner diameter of the opening in said circular flange is sized to accommodate the diameter of said lower end of the cylindrical sleeve, and wherein said inner opening has disposed therein a circumferential recess, and wherein said seal means comprises a sealing ring disposed in said circumferential recess for engaging said lower end of the cylindrical sleeve for effecting a seal therebetween.

* * * * *